US012747010B2

(12) United States Patent
Plain

(10) Patent No.: US 12,747,010 B2
(45) Date of Patent: Sep. 29, 2026

(54) ANTI-DROWNING APPARATUS

(71) Applicant: John Plain, Park Ridge, NJ (US)

(72) Inventor: John Plain, Park Ridge, NJ (US)

( * ) Notice: Subject to any disclaimer, the term of this patent is extended or adjusted under 35 U.S.C. 154(b) by 790 days.

(21) Appl. No.: 18/070,584

(22) Filed: Nov. 29, 2022

(65) Prior Publication Data

US 2023/0271685 A1 Aug. 31, 2023

Related U.S. Application Data

(60) Provisional application No. 63/284,242, filed on Nov. 30, 2021.

(51) Int. Cl.

| | |
|---|---|
| ***B63C 9/15*** | (2006.01) |
| ***A41D 13/012*** | (2006.01) |
| ***G08B 21/08*** | (2006.01) |

(52) U.S. Cl.

CPC .......... *B63C 9/155* (2013.01); *A41D 13/0125* (2013.01); *G08B 21/088* (2013.01)

(58) Field of Classification Search

CPC .... B63C 9/00; B63C 9/08; B63C 9/13; B63C 9/15; B63C 9/155; B63C 9/18; A41D 13/012; A41D 13/0125; G08B 21/088

USPC ................ 441/80, 88, 90, 91, 106, 112, 120

See application file for complete search history.

(56) References Cited

U.S. PATENT DOCUMENTS

| | | | | |
|---|---|---|---|---|
| 3,646,625 A * | 3/1972 | Geier | A41F 3/00 441/121 |
| 5,092,802 A * | 3/1992 | Jones | B63C 9/093 441/106 |
| 6,231,411 B1 * | 5/2001 | Vinay | B63C 9/155 441/88 |
| 9,371,119 B2 * | 6/2016 | Malcom | B63C 9/1255 |
| 2005/0138716 A1 * | 6/2005 | Orsos | A41D 7/003 2/67 |
| 2008/0268731 A1 * | 10/2008 | Lahyani | B63C 9/1055 441/89 |
| 2016/0121981 A1 * | 5/2016 | Hicks | A63B 31/00 441/106 |
| 2018/0312232 A1 * | 11/2018 | de Grasse | B63C 9/081 |
| 2019/0061889 A1 * | 2/2019 | Cardi | B63C 9/155 |

* cited by examiner

*Primary Examiner* — Daniel V Venne

(74) *Attorney, Agent, or Firm* — Meagher Emanuel Laks Goldberg & Liao LLP

(57) ABSTRACT

An anti-drowning apparatus configured to inflate a balloon to provide emergency flotation when a swimmer with the anti-drowning apparatus is submerged to a selected depth so as to help the swimmer return to the surface. The anti-drowning apparatus may be integrated into a swimming garment. An integrated emergency flotation apparatus may also include a manual pump configured to inflate a compression port used to store compressed air for inflating the balloon.

20 Claims, 4 Drawing Sheets

ANTI-DROWNING APPARATUS

CROSS-REFERENCE TO RELATED APPLICATION

This application claims priority to U.S. Provisional Patent Application No. 63/284,242 filed on Nov. 30, 2021 entitled ANTI-DROWNING BATHING SUIT, which application is incorporated herein by reference in its entirety.

FIELD OF THE DISCLOSURE

The present disclosure generally relates to sports safety equipment and, in particular, to an anti-drowning apparatus configured to inflate a balloon when a swimmer with the apparatus is submerged to an unsafe depth so as to help the swimmer return to the surface.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Every year in the United States alone, approximately 4,000 people die as a result of drowning; and, of course, this figure is much higher when taken worldwide. A disproportionate number of the drowning deaths occur in children. In fact, drowning is the second leading cause of accidental death in children up to the age of 14, second only to auto accident fatalities.

Drowning can occur anywhere that people swim or venture into the water either to go swimming or to go boating, for boats sometimes capsize, throwing their occupants into the water; many of whom, one supposes, cannot swim at all or are at best, very weak simmers. People can drown in swimming pools, which appear relatively safe, lakes, rivers, ponds, or in the ocean where there is undoubtedly the greatest hazard to swimmers and boaters.

Those who can't swim at all are, of course, the most at risk of drowning. While people who are weak simmers often over estimate their ability in the water and put themselves in positions from which they cannot extricate themselves without aid from someone else. Small children are especially at risk as they often wander into pools without any adults present and end up drowning.

SUMMARY

Various deficiencies in the prior art are addressed by an anti-drowning apparatus configured to inflate a balloon when a swimmer with the apparatus is submerged to an unsafe depth so as to help the swimmer return to the surface. The apparatus may be integrated into a swimming garment. An integrated emergency flotation apparatus may also include a manual pump configured to inflate a compression port used to store compressed air for inflating the balloon.

A swimming garment including emergency flotation apparatus according to an embodiment comprises: an inner tube configured for storing compressed air and slidably engaged with an outer tube, each of the inner and outer tubes having respective apertures formed therein, wherein compressed air stored in the inner tube is expelled into a flotation balloon when the inner tube aperture and the outer tube aperture are aligned; a spring disposed between a proximate end of the outer tube and a proximate end of the inner tube to urge the inner tube into a position wherein the inner tube aperture is not aligned with the outer tube aperture; and a water pressure responsive mechanism configured to urge the inner tube toward the spring, wherein a water pressure level associated with an unsafe depth is sufficient to cause the inner tube to compress the spring such that the inner tube aperture and outer tube aperture are aligned; wherein in response to inflation of the flotation balloon the swimming garment is directed toward the surface of the water. When the swimmer floats back up to the surface of the water such that the water pressure level is not associated with an unsafe depth, then the spring will not be compressed with force sufficient to keep the inner tube aperture and outer tube aperture aligned, thereby sealing the air in the flotation balloon.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
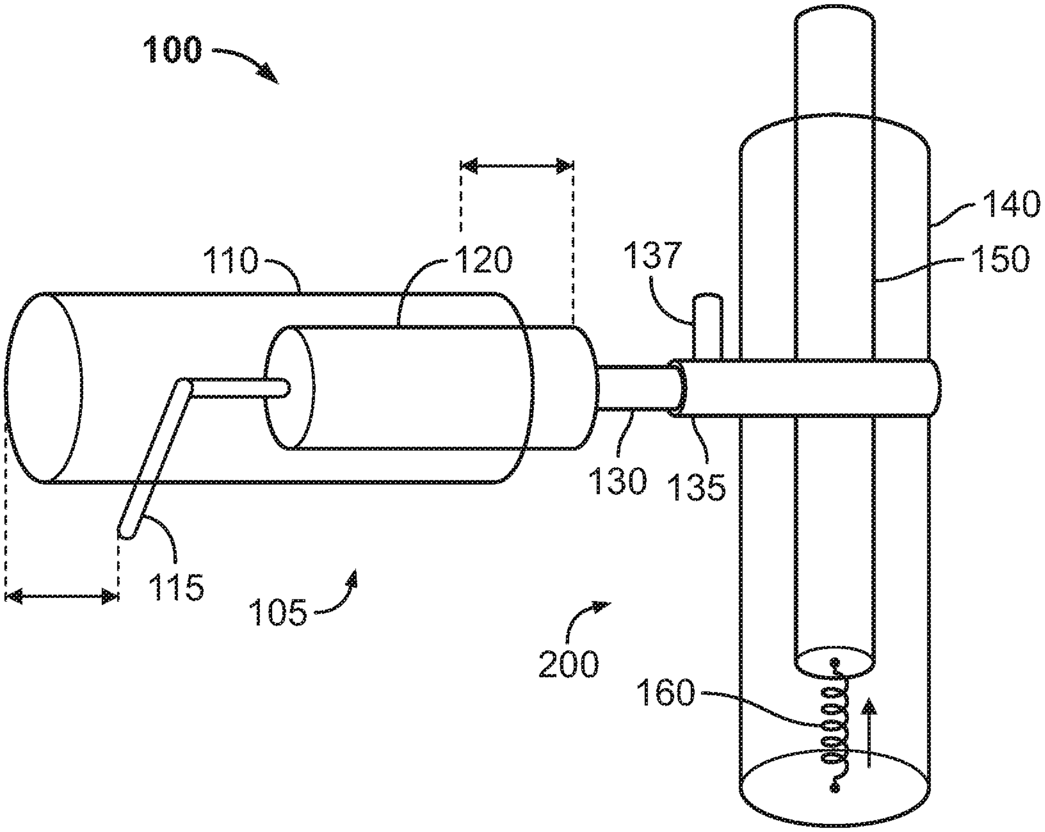
FIG. 1 depicts an anti-drowning apparatus according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments of an anti-drowning bathing suit and an emergency inflation device are presented and described herein, including embodiments directed towards children and embodiments directed toward adults.

Various embodiments provide a bathing suit having a pocket disposed upon it that is close to the right (or left) hip on both a boy's and girl's bathing suit. This pocket may be located in between inner and outer layers of a double layer bathing suit and includes a pocket that may be accessed by opening a Velcro strip on the outer layer of the bathing suit.

Various embodiments provide a pump mechanisms including an outer cylinder inside of which is a smaller cylinder and attached to the back of this smaller cylinder is a lever which is used to move this cylinder toward the front of the large cylinder, thereby forcing air into a small space denoted as a compression port.

Figure 2:
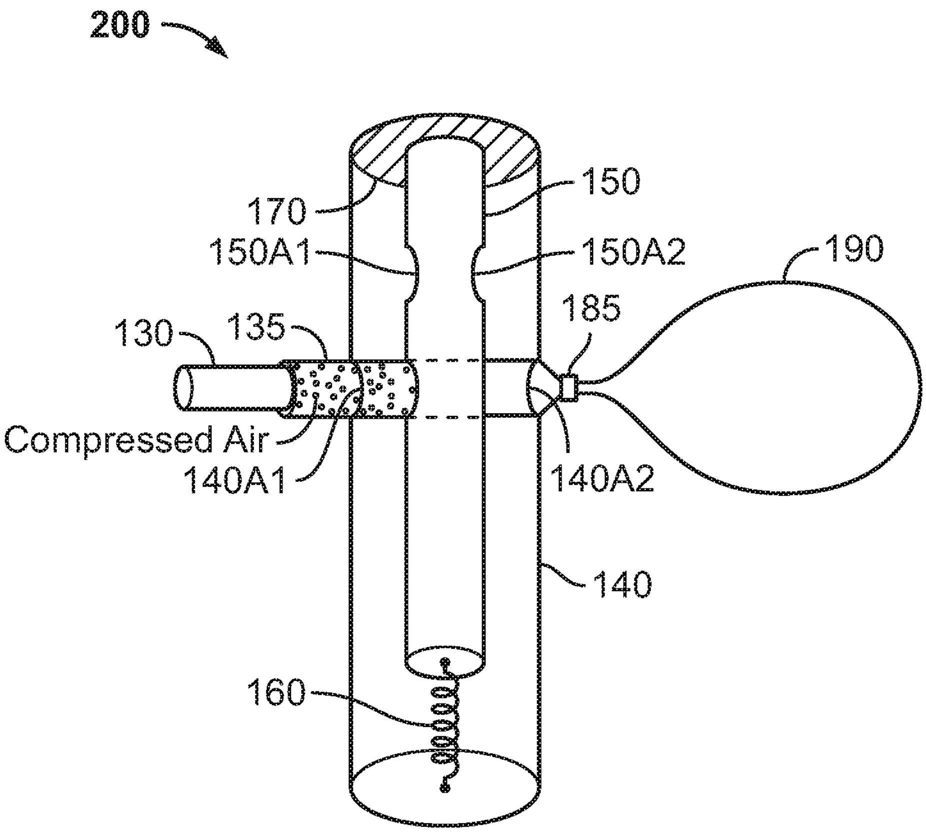
FIG. 2 depicts an emergency inflation apparatus according to an embodiment and suitable for use in the anti-drowning apparatus of FIG. 1.

FIG. 1 depicts an anti-drowning apparatus according to an embodiment. FIG. 2 depicts an emergency inflation apparatus according to an embodiment and suitable for use in the anti-drowning apparatus of FIG. 1. Specifically, the anti-drowning apparatus of FIG. 1 is depicted as including an emergency inflation apparatus 200 and a manual air pump 105. Generally speaking, the emergency inflation apparatus 200 is configured to inflate a flotation balloon 190 attached thereto in the event of an increase in water pressure level consistent with a water depth deemed to be dangerous, which depth may be selectable based on a water pressure responsive mechanism (e.g., a diaphragm) as discussed below. The depth may be selected as approximating a depth slightly below a normal depth used by a swimmer/bather, or a depth associated with a swimmer/bather sinking and in danger of drowning.

Referring to FIG. 1, the anti-drowning apparatus 100 comprises a manual air pump 105 formed as, illustratively, a simply pneumatic mechanism including an outer cylinder 110 slideably engaged with an inner cylinder 120 disposed therein and cooperating with a compression piston 130, wherein a compressing lever 115 may be used to move the inner cylinder 120 back and forth with respect to the outer cylinder 110, thereby causing the compression piston 130 to force air into a compression port 135 for storage. The compression port 135 is configured to store compressed air sufficient to fill a flotation device such as a balloon as will be discussed below.

Referring to FIGS. 1-2, the anti-drowning apparatus comprises an outer tube 140 slideably engaged with an inner tube 150 disposed therein. The inner tube 150 is slidably engaged with the outer tube 140.

Each of the inner and outer tubes have two respective apertures formed therein, which when aligned in accordance with the position of the inner tube 150 with respect to the outer tube 140 allow compressed air to pass from the compression port 135 to a flotation device/balloon. Specifically, a first outer tube aperture 140A1 is associated with the compression port 135 so as to receive pumped or pressurized air thereby, while a second outer tube aperture 140A2 is associated with an inflation port to as to deliver pressurized air thereby to a balloon or other flotation device.

In a first or "pump/store" mode of operation, the respective positions of the slideably engaged outer tube 140 and inner tube 150 as such that the outer tube apertures 140A1/140A2 are not aligned with the inner tube apertures 150A1/150A2 such that compressed air may be pumped into the compression port 135 for storage therein. The inner tube 150 may be manually moved or positioned to achieve this alignment.

In a second or "inflate" mode of operation, the respective positions of the slideably engaged outer tube 140 and an inner tube 150 as such that the outer tube apertures 140A1/140A2 are aligned with the inner tube apertures 150A1/150A2 such that compressed air stored within the compression port 135 passes through the aligned first apertures 140A1/150A1 of the outer/inner tubes 140/150, the outer tube 140 and inner tube 150, and the second apertures 140A2/150A2 of the outer/inner tubes 140/150 to a balloon 190 or other inflatable device configured to receive air for inflation via the second outer tube aperture 140A2 directly, or via an inflation nozzle or valve 185 affixed thereto and configured to direct air from the outer tube aperture 140A2 to the balloon 190 or other inflatable device. The inner tube 150 may be manually moved or positioned to achieve this alignment, or such movement/positioning may be effected using a water pressure sensitive mechanism.

In various embodiments, the first or "pump/store" mode of operation may be used prior to wearing the swimming garment (or at least entering the water with the garment) so that the swimmer enters the water with the compression port 135 storing a sufficient amount of compressed air, and the inner tube 150 in an slidably extended position with respect to the outer tube 140 such that the outer tube apertures 140A1/140A2 and inner tube apertures 150A1/150A2 are not aligned (thereby sealing the air in the compression port 135).

A spring 160 is disposed between a proximate end of the outer tube 140 and a proximate end of the inner tube 150 to urge separation of the proximate end of the outer tube 140 and a proximate end of the inner tube 150 so as to move the inner tube to the extended position. In doing so, the spring acts to position the inner 150 and outer 140 tubes in the first or "pump/store" mode of operation (i.e., no alignment of apertures).

A water pressure responsive mechanism 170 is mounted on a distal end of either or both of the outer tube 140 and inner tube 150. The water pressure responsive mechanism may comprise a diaphragm 170 or similar device cooperating with the inner tube 150 and configured to be mechanically displaced when the pressure on one side (e.g., underwater pressure) exceeds the pressure on the other side (e.g., the unpressurized air between the outer tube 140 and inner tube 150). The diaphragm may comprise a flexible or resilient material configured to perform the necessary functions as described herein. The external pressure imparted to the water pressure responsive mechanism (e.g., diaphragm) causes the diaphragm to urge the distal end of the inner tube 150 in a manner tending to compress the spring 160 and move the proximate end of the inner tube 150 toward the proximate end of the outer tube 140.

When the force of the external pressure is not great (i.e., barely underwater, or standard "out of water" atmospheric pressure) the force imparted by the spring 160 to the proximate end of the inner tube 150 is such that the spring acts to position the inner 150 in the extended mode with respect to the outer 140 tube (i.e., no alignment of apertures).

As the force of the external water pressure (e.g., getting too deep underwater) imparted to the water pressure responsive mechanism (e.g., diaphragm) increases, the pressure causes the diaphragm to be displaced and correspondingly urge the distal end of the inner tube 150 such that the spring 160 begins compressing and the inner tube 150 begins moving toward the spring. If the external pressure is sufficient, then the force associated with the movement of the inner tube 150 will overcome the force of the spring 160 and the outer tube apertures 140A1/140A2 and inner tube apertures 150A1/150A2 will be brought into alignment. That is, if the force of the external pressure is sufficient, then the spring 160 will be sufficiently compressed such that the inner 150 and outer 140 tubes enter the second or "inflate" mode of operation (i.e., alignment of the apertures as discussed) and the balloon 190 or other inflation device will be inflated such that the swimmer will experience an increase in buoyancy and be brought to the surface of the water.

By selecting a specific diaphragm 170, spring 160, or combination thereof, the amount of pressure needed to enter the second or "inflate" mode of operation may be adapted. That is, each diaphragm/spring combination may be associated with a specific pressure consistent with a water depth deemed to be dangerous at which balloon inflation is triggered. The appropriate triggering depth (diaphragm/spring combination) may be selected in accordance with the physical characteristics of the swimmer, the skill of the swimmer, the age of the swimmer, and so on. For example, is the swimmer a tall or short person, a person that does not know how to swim or swim in certain conditions, an adult or a child, and so on.

The water depth deemed to be dangerous may comprise 2' or 4' or 6' or some other depth, or may be selected as approximating a depth slightly below a normal depth of the anti-drowning apparatus when in use by a swimmer (bather), such as when integrated into swimwear. For a 6' tall man that depth might be 4' whereas for a child that depth would be less. Alternatively, the water depth might be a deeper depth associated with sinking such as 10' or the like.

Figure 4:
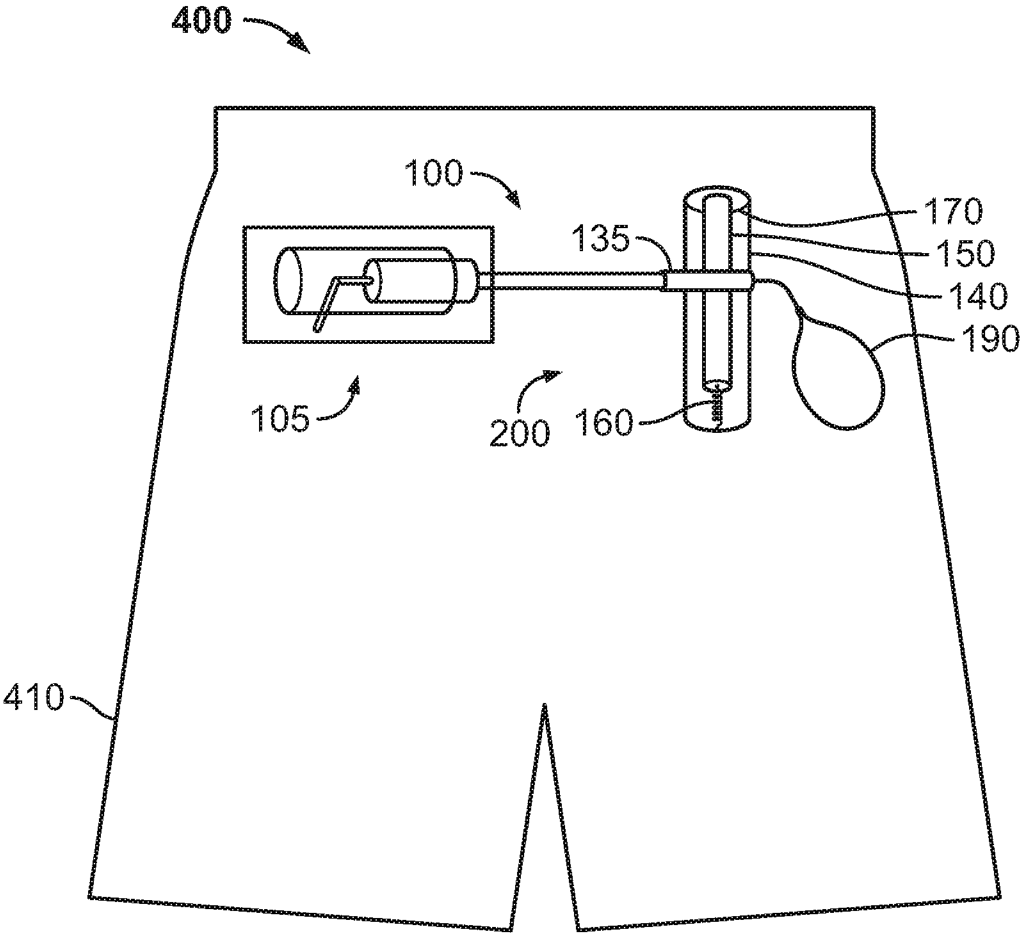
FIG. 4 depicts a swimming garment configured to use the anti-drowning apparatus of FIG. 1.

FIG. 4 depicts a swimming garment configured to use the anti-drowning apparatus of FIG. 1. It is noted that FIG. 4 depicts use of an anti-drowning apparatus including both the emergency inflation apparatus 200 and a manual air pump 105. In other embodiments, only the emergency inflation apparatus 200 is used.

As depicted in FIG. 4, the swimming garment may comprise a multilayer garment where the various system components are disposed between layers such that only the particular input or output mechanisms are visible (e.g., output port or valve 185 to attach a balloon 190 or other flotation device). Further, the location of the various system components is selected in a manner which, hopefully, will tend to keep the swimmer upright as well as at the surface.

Figure 3A:
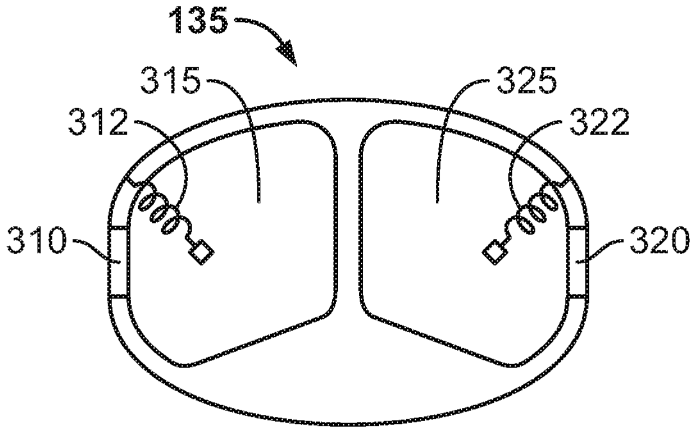
FIG. 3 depicts a cutaway view of a compression port within the emergency inflation apparatus of FIGS. 1-2.
Figure 3B:
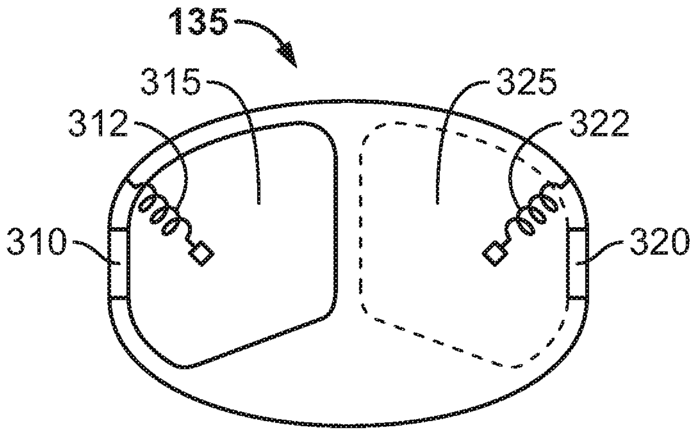

FIG. 3 depicts a cutaway view of a compression port within the anti-drowning apparatus of FIGS. 1-2. Specifically, FIG. 3 depicts a view into the interior of the compression port 135 depicting the compression port 135 as a tubular member having one or more doors or valves generally operative to allow the passage of air in one direction; namely, from the compression piston 130 toward the inner cylinder 120 of the emergency flotation apparatus so as to force air into the inner cylinder 120 for storage therein.

As depicted in FIG. 3, a first door 315 is pivotally mounted to a hinge 310 and operable to allow air flow in an open position and prevent airflow in a closed position. A spring 312 mounted to the first door 315 or hinge 310 urges the first door 315 to the closed position. When air is pumped into the compression port 135 via, illustratively, the compression piston 130, a tip of the compression piston pushes against the first door 315 and overcomes the urging of the spring 312 to thereby move the first door 315 to the open position.

As depicted in FIG. 3, an optional second door 325 is pivotally mounted to a hinge 320 and operable to allow air flow in an open position and prevent airflow in a closed position. A spring 322 mounted to the second door 325 or hinge 320 urges the second door 325 to the closed position. When air is pumped into the compression port 135 via, illustratively, the compression piston 130, a tip of the compression piston pushes against the optional second door 325 and overcomes the urging of the spring 312 to thereby move the first door 315 to the open position.

The compression port 135 may include any valve mechanism (plastic, metal, etc.) suitable for use in receiving/passing air therethrough to a storage space and preventing the air from escaping. For example, any metal or plastic valve mechanisms wherein a tip of the compression piston may actuate an opening to the compression port 135 such that compressed air may be injected thereto. The storage space should be of sufficient volume and strength to store an amount of compressed air sufficient to inflate the flotation device.

Various embodiments provide an opening in the outer cylinder which allows a lever 115 attached to the back of the inner cylinder 120 to move it back and forth to compress air when it is moved toward the front of the outer cylinder 110 and then back again to begin the compression process over again as needed. When this lever 115 is pressed against the left side of the opening, in the large cylinder 110, it moves the small cylinder 120 forward to compress air in the compression port 135 and when it is pressed against the right side of the just mentioned opening it moves the cylinder backwards again.

Various embodiments provide a hinged "door" which opens when the small cylinder moves forward to compress the air in the compression port 135, and this "door" is opened when the small cylinder moves forward into the compression port 135 and is held open by the small cylinder pressing against it. When the small cylinder is moved backwards by the lever, the "door" is snapped shut by spring action since the small cylinder is no longer pressing against it, and the compressed air is thus trapped in the compression port. In this manner, the compression port can be filled with more and more compressed air depending on how many times the lever is moved back and forth.

Various embodiments provide a small "tab" inside of the compression port 135, and when the pressure in the compression port 135 reaching a pre-determined level, this tab moves upward into a small receptacle which is visible on the outside of both a boy's and girl's bathing suit indicating that the compression port 135 has reached the pre-determined level of pressure.

The lever that protrudes from the out cylinder and that is used to move the inner cylinder for the purpose of compressing the air is folded up and stored inside the outer cylinder when not in use. Everything described so far shall be designed to fit comfortably inside a "pocket" near the waist of a child's bathing suit.

Various embodiments provide an outer cylinder inside of which is an inner cylinder that can be moved back and forth by lever action so as to compress air in a compression port 135. When the inner cylinder is pushed forward it opens a hinged "door" and keeps it open while it is forcing air into the compression port 135, and when the inner cylinder is pulled backwards, the hinged "door" is snapped immediately shut by spring action in order to keep the compressed air from escaping the compression port 135. At can be seen in one of the accompanying diagrams; when the inner cylinder is withdrawn from the compression port 135 it no longer pressed against the "doors", then allowing springs inside of the compression port 135 to immediately snap the "doors" shut.

Various embodiments provide two vertically placed tubes (see diagrams) which are located close to the horizontally configured cylinders in a "pocket" inside of the bathing suit. One tube fits tightly inside of the other tube and protrudes slightly from the top of the out tube and has a rubbery diaphragm covering its upper end. The bottom of the inner tube is attached by spring to the bottom of the outer tube. (see accompanying diagrams)

When a child wearing an embodiment of the "Anti-Drowning Bathing Suit" starts to drown and sinks to a certain depth beneath the water's surface, the increased level of water pressure impinging on the diaphragm (just mentioned) on top of the inner tube shall become great enough to push the inner tube downward through the outer tube, thereby compressing the spring that attaches to two tubes together.

The outer tube is located close to the compression port 135 in the pocket inside of the bathing suit. These is an opening in the inner tube and when the spring attaching the tubes together is un-compressed, this opening is positioned above the compression port 135 as the inner tube reset inside of the outer tube.

In the springs' un-compressed state, the inner tube blocks air from flowing out of the compression port 135 as a result of the way my invention is designed.

However, when a child sinks too far beneath the water's surface, the increased level of water pressure on the diaphragm at the top of the inner tube urges or pushes the inner tube downward through the outer tube so that the opening in the inner tube aligns directly with the compression port 135.

The compressed air in the compression port 135 then flows through a passage way in the inner tube and into a small tube-shaped piece on the opposite side of the inner tube. The compressed air then flows through this piece and into a balloon which rests against a child's bathing suit on the outside of the bathing suit. This balloon very quickly inflates and floats the child to the water's surface, preventing the child from drowning!

As the balloon floats the child to the surface, the water pressure level pushing down on the inner tubes diaphragm decreases, thus allowing the spring to urge or push the inner tube up through the outer tube such that the opening the inner tube no longer aligns with the compression port 135 so as to keep the air in the now inflated balloon from flowing back into the compression port 135.

Various embodiments provide that the components used to manufacture the "Anti-Drowning Bathing Suit" may be made out of very light plastic so as not to weigh down the bathing suit.

All of the crucial parameters of the embodiments such as how far under water a child should be allowed to sink before the life-saving balloon inflates, the optimal pressure in the compression port 135, and the elastic properties of the balloon are readily determined through experimentation using human like dummies that simulate the event of a protentional drowning tragedy.

Various embodiments provide an air intake plug on the waist band of the bathing suits that can be pulled out in order to let air into the "pockets" of the double layers bathing suit so that it can be compressed into the compression port 135.

When the compression in this port has reaching the pre-determined optimal lever, the air pressure in the port pushes a little tab, which is held in place by a small spring when the port is not fully pressurized, up into a little translucent cylinder above the bathing suits waist band indicating that the port is now fully pressurized.

The port can be pressurized by using the compressing lever previously discussed and illustrated in accompanying diagrams. The compressing lever can be folded into a shorter segment and stored in the outer cylinder when not in use.

The compressing lever can be accessed by opening a Velcro strip on the bathing suit's waist band, and the lever can be pulled out and moved back and forth in the manner previously described in order to pressurize the compression port 135.

Since children up to 14 years of age are the most frequent victims of drowning, my invention is designed to float even the heaviest of 14-year old's up to the water's surface as quickly as possible and, of course, it will do so for the lighter children also.

Various embodiments provide a small threaded piece on the balloon with an attached screw that when taken out releases air from the balloon.

In order to ensure that the rapidly inflating balloon does not hurt a child, Various embodiments provide a foam protecting pad on the bathing suit next to the balloon.

The various embodiments are suitable for use by adults as well as children. Various embodiments provide a small hose leading directly from the compression port 135 to the balloon 190, and if an adult starts to get in trouble on the water's surface, he or she can manually activate a small valve on this hose to release air immediately into the balloon, thus preventing the adult from sinking below the surface.

The various embodiments disclosed herein include, for example, an emergency flotation apparatus suitable for use with a swimming garment, the apparatus comprising a compression port 135 configured to store compressed air; an inner tube slidably engaged with an outer tube, each of the inner and outer tubes having respective apertures formed therein, wherein compressed air stored in the compression port 135 is expelled into a flotation balloon when the inner tube apertures and outer tube apertures are aligned; a spring disposed between a proximate end of the outer tube and a proximate end of the inner tube to urge the inner tube proximate end away from the outer tube proximate end such that the inner tube apertures and outer tube apertures are not aligned; and a water pressure responsive mechanism configured to urge the inner tube toward the spring, wherein a water pressure level associated with an unsafe depth is sufficient to cause compression of the spring such that the inner tube aperture and outer tube aperture become aligned such that the flotation balloon is inflated. A water pressure level not associated with an unsafe depth is not sufficient to cause compression of the spring such that the inner tube aperture and outer tube aperture become aligned. The water pressure responsive mechanism may comprise a diaphragm substantially covering a distal end of the inner and outer tubes. The water pressure responsive mechanism may comprise a diaphragm substantially covering a distal end of the inner and outer tubes. The apparatus may also include an air compressor 105, having a compressing piston 130 configured to force air into the compression port 135. The air compressor 105 may comprise a manual air compressor having an inner cylinder 120 slidably engaged with an outer cylinder 110 and, in response to a substantially axial force exerted upon the inner cylinder via a compressing lever connected thereto, urging air into the compression port 135 thereby.

A water pressure level associated with an unsafe depth may comprise a water pressure level at which the force exerted upon the inner tube by the diaphragm exceeds the force exerted upon the inner tube by the spring. Each of a plurality of diaphragm/spring combinations may be associated with a respective unsafe depth. Changing one or both of the diaphragm and spring may result in a change of the unsafe depth (i.e., select a new unsafe depth). A swimming garment may be sold with the emergency flotation device as well as with a kit including a number of springs and/or diaphragms so as to allow the purchaser to select the unsafe depth that will trigger inflation of the balloon.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. An anti-drowning apparatus, comprising:

a compression port configured to store compressed air;

an inner tube slidably engaged with an outer tube, each of the inner and outer tubes having respective apertures formed therein, wherein compressed air stored in the compression port is expelled into a flotation balloon when the inner tube apertures and outer tube apertures are aligned;

a spring disposed between a proximate end of the outer tube and a proximate end of the inner tube to urge separation of the proximate end of the outer tube and proximate end of the inner tube such that the inner tube apertures and outer tube apertures are not aligned; and a water pressure responsive mechanism configured to urge the inner tube toward the spring in response to an increased level of water pressure imparted thereto, wherein a water pressure level associated with a selected depth is sufficient to cause compression of the spring such that the inner tube aperture and outer tube aperture become aligned such that the flotation balloon is inflated.

2. The anti-drowning apparatus of claim 1, wherein a water pressure level less than that of the selected depth is not sufficient to cause compression of the spring such that the inner tube aperture and outer tube aperture become aligned.

3. The anti-drowning apparatus of claim 1, wherein the water pressure responsive mechanism comprises a diaphragm substantially covering a distal end of the inner and outer tubes, the diaphragm comprising a resilient material configured to urge the distal end of the inner tube in a manner tending to compress the spring in response to an increase in water pressure level imparted thereto.

4. The anti-drowning apparatus of claim 2, wherein the water pressure responsive mechanism comprises a diaphragm substantially covering a distal end of the inner and outer tubes, the diaphragm comprising a resilient material configured to urge the distal end of the inner tube in a manner tending to compress the spring in response to an increase in water pressure level imparted thereto.

5. The anti-drowning apparatus of claim 1, further comprising:

an air pump, having a compressing piston configured to force air into the compression port.

6. The anti-drowning apparatus of claim 5, wherein the air pump comprises a manual air pump having an inner cylinder slidably engaged with an outer cylinder and configured to force air into the compression port responsive to motion of the inner cylinder via a compressing lever connected thereto.

7. The anti-drowning apparatus of claim 4, wherein the water pressure level associated with the selected depth comprises a water pressure level at which the diaphragm urges the inner tube by an amount sufficient to align the inner and outer tube apertures.

8. The anti-drowning apparatus of claim 7, wherein the each of a plurality of diaphragm/spring combinations is associated with a respective selected depth.

9. The anti-drowning apparatus of claim 8, wherein changing one or both of the diaphragm and spring results in a change of the selected depth.

10. The anti-drowning apparatus of claim 1 integrated within a swimming garment.

11. The anti-drowning apparatus of claim 5 integrated within a swimming garment.

12. An anti-drowning apparatus integrated with a swimming garment to provide emergency flotation thereto, the anti-drowning apparatus comprising:

a compression port configured to store compressed air;

an inner tube slidably engaged with an outer tube, each of the inner and outer tubes having respective apertures formed therein, wherein compressed air stored in the compression port is expelled into a flotation balloon when the inner tube apertures and outer tube apertures are aligned;

a spring disposed between a proximate end of the outer tube and a proximate end of the inner tube to urge separation of the proximate end of the outer tube and proximate end of the inner tube such that the inner tube apertures and outer tube apertures are not aligned; and a water pressure responsive mechanism configured to urge the inner tube toward the spring in response to an increased level of water pressure imparted thereto, wherein a water pressure level associated with a selected depth is sufficient to cause compression of the spring such that the inner tube aperture and outer tube aperture become aligned such that the flotation balloon is inflated.

13. The anti-drowning apparatus of claim 12, wherein a water pressure level less than that of the selected depth is not sufficient to cause compression of the spring such that the inner tube aperture and outer tube aperture become aligned.

14. The anti-drowning apparatus of claim 12, wherein the water pressure responsive mechanism comprises a diaphragm substantially covering a distal end of the inner and outer tubes, the diaphragm comprising a resilient material configured to urge the distal end of the inner tube in a manner tending to compress the spring in response to an increase in water pressure level imparted thereto.

15. The anti-drowning apparatus of claim 13, wherein the water pressure responsive mechanism comprises a diaphragm substantially covering a distal end of the inner and outer tubes, the diaphragm comprising a resilient material configured to urge the distal end of the inner tube in a manner tending to compress the spring in response to an increase in water pressure level imparted thereto.

16. The anti-drowning apparatus of claim 12, further comprising:

an air pump, having a compressing piston configured to force air into the compression port.

17. The anti-drowning apparatus of claim 16, wherein the air pump comprises a manual air pump having an inner cylinder slidably engaged with an outer cylinder and configured to force air into the compression port responsive to motion of the inner cylinder via a compressing lever connected thereto.

18. The anti-drowning apparatus of claim 15, wherein the water pressure level associated with the selected depth comprises a water pressure level at which the diaphragm urges the inner tube by an amount sufficient to align the inner and outer tube apertures.

19. The anti-drowning apparatus of claim 18, wherein the each of a plurality of diaphragm/spring combinations is associated with a respective selected depth.

20. The anti-drowning apparatus of claim 19, wherein changing one or both of the diaphragm and spring results in a change of selected depth.

* * * * *